(12) United States Patent
Ni et al.

(10) Patent No.: US 8,720,343 B2
(45) Date of Patent: May 13, 2014

(54) TRANSVERSE-LONGITUDINAL PERPENDICULAR AUTOMATIC ADJUSTING APPARATUS

(75) Inventors: Haifeng Ni, Liaoning (CN); Qi Lu, Liaoning (CN); Yuan Wang, Liaoning (CN)

(73) Assignee: Dalian Huarui Heavy Industry Goup Co., Ltd., Dalian, Liaoning (CN)

( * ) Notice: Subject to any disclaimer, the term of this patent is extended or adjusted under 35 U.S.C. 154(b) by 168 days.

(21) Appl. No.: 13/375,211

(22) PCT Filed: Aug. 27, 2009

(86) PCT No.: PCT/CN2009/073554
§ 371 (c)(1),
(2), (4) Date: Nov. 29, 2011

(87) PCT Pub. No.: WO2010/139141
PCT Pub. Date: Dec. 9, 2010

(65) Prior Publication Data
US 2012/0076602 A1    Mar. 29, 2012

(30) Foreign Application Priority Data

Jun. 1, 2009  (CN) .......................... 2009 1 0011809
Jun. 1, 2009  (CN) ...................... 2009 2 0014304 U

(51) Int. Cl.
*B61B 3/00*      (2006.01)

(52) U.S. Cl.
USPC ............................................................ 104/96

(58) Field of Classification Search
USPC ...................................... 104/89–96, 106, 107
See application file for complete search history.

(56) References Cited

U.S. PATENT DOCUMENTS 5,809,896 A * 9/1998 Gersemsky ..................... 104/93

* cited by examiner

*Primary Examiner* — R. J. McCarry, Jr.
(74) *Attorney, Agent, or Firm* — Squire Sanders (US) LLP

(57) ABSTRACT

A transverse-longitudinal perpendicular automatic adjusting apparatus used for a cutting machine is disclosed. The automatic adjusting apparatus comprises a cross beam (8), a driving trolley (5), a driven trolley (7), a rotating shaft (1), a rolling bearing (2), a driving connecting plate (3) and a disc spring (4). The cross beam (8) is a drawn cross beam. The driving connecting plate (3) is connected to a bottom surface of the cross beam (8). A bottom surface of the cross beam is rigidly connected with a driven connecting plate (6), which is connected with the driven trolley (7). The apparatus ensures stable operation and is inexpensive. The apparatus is easy to adjust, install and manufacture.

4 Claims, 1 Drawing Sheet

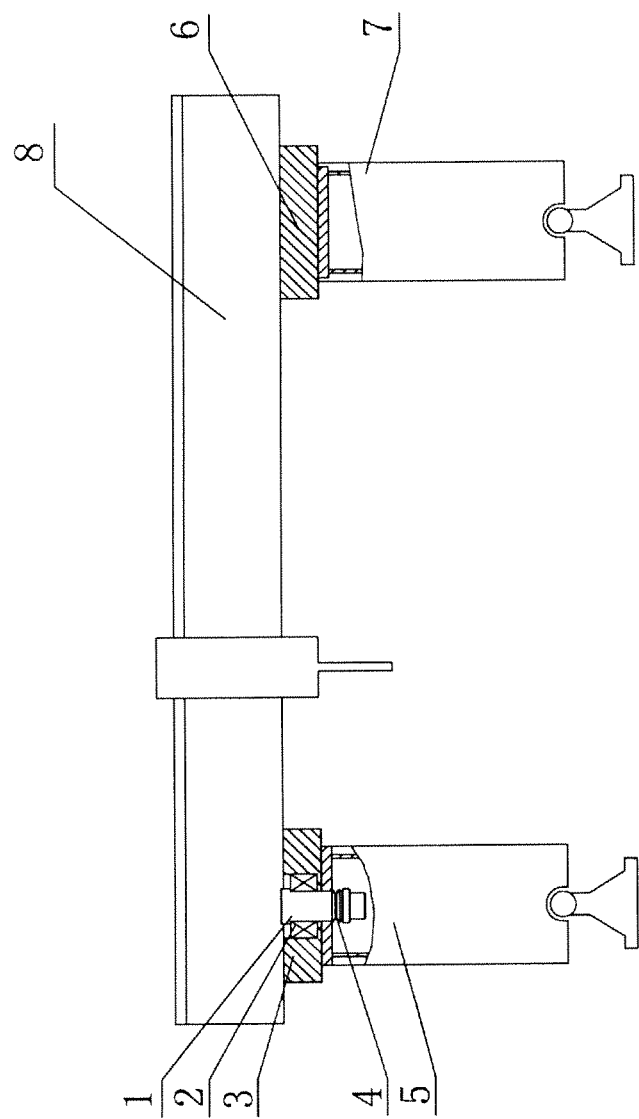

TRANSVERSE-LONGITUDINAL PERPENDICULAR AUTOMATIC ADJUSTING APPARATUS

TECHNICAL FIELD

The present invention relates to assembly components of cutting machines and particularly a transverse-longitudinal perpendicular automatic adjusting apparatus adapted to use double-sided sliding means for guiding.

BACKGROUND OF THE INVENTION

At present, there exist a variety of cutting machines for cutting metal members, among which the gantry-type numerical control cutting machine is widely used. This machine comprises a cross beam, a driving trolley, and a driven trolley, wherein the driving trolley and the driven trolley are symmetrically and rigidly connected to the bottom surface of the welded cross beam at two ends thereof, at two ends thereof, said rigid connection being in such a way that a connecting plate is connected to the bottom surface of the cross beam, and the connecting plate is connected to the driving trolley and the driven trolley. Such a machine has the following shortcomings and deficiencies:

1. The cross beam is individually welded. The manufacturing is difficult, costly, and it is not easy to ensure manufacturing precision. Meanwhile, the manufactured beam is big, heavy, and has an unpleasant appearance.

2. As the two ends of the cross beam are rigidly connected to the driving trolley and the driven trolley, stress and deformation may be incurred due to certain reasons during the operation of the cutting machine. This affects the stable operation of the cutting machine, and in serious circumstances machine parts may be damaged.

DETAILED DESCRIPTION OF THE INVENTION

Technical Problems

In order to avoid the disadvantages of the prior art technologies, the present invention provides a transverse-longitudinal perpendicular automatic adjusting apparatus which is well designed, has a compact structure, and can operate in a stable and reliable manner. This apparatus is easy to install, manufacture, and adjust. At the same time this apparatus has a pleasant appearance, requires low manufacturing cost, and is convenient to use.

Technical Solution

An apparatus in the present invention is a transverse cross beam-longitudinal rail perpendicular automatic adjusting apparatus. The objective of the invention is met by the following technical solution: the apparatus comprises a cross beam, a driving trolley, and a driven trolley, wherein said cross beam is a drawn beam, said driven trolley is rigidly connected to one end of said cross beam, and said driving trolley and the other end of said cross beam are equipped with a transverse-longitudinal perpendicular automatic adjusting assembly, wherein said transverselongitudinal perpendicular automatic adjusting assembly comprises a rotating shaft, a rolling bearing, a driving connecting plate, and a disc spring, wherein a bottom surface of said cross beam is connected to said driving connecting plate, a hole for housing said rolling bearing is provided at a center of said driving connecting plate, and with said rolling bearing placed in said hole, a bottom end of said rotating shaft is fixed to said driving trolley with said rotating shaft passing through an upper surface of said driving trolley and said disc spring; wherein said driven trolley and said cross beam are rigidly connected in such a way that said bottom surface of said cross beam is connected to said driven connecting plate and said driven connecting plate is connected to said driven trolley.

Said drawn cross beam may be a one-time drawn beam drawn from aluminum alloy.

Advantages

Compared with prior art technologies, the transverse-longitudinal perpendicular automatic adjusting apparatus according to the present invention provides various advantages such as the follows: it is well designed and has a compact structure; it operates in a stable and reliable manner; it is easy to install, manufacture, and adjust; further it features a pleasant appearance, requires low manufacturing cost, and is convenient to use. As the cross beam used in the present invention is a beam formed by one-time drawing from aluminum alloy, the function of the cross beam is not affected and the cross beam has a light weight and a pleasant appearance. At the same time the cross beam is especially suitable for mass production and its production is easy to organize and prepare. Furthermore, as a transverse/longitudinal perpendicular automatic adjusting assembly is flexibly connected to the cross beam and an end of the driving trolley, the degree of the freedom of movement of the driving trolley is increased, thus ensuring a normal, stable operation of the entire machine.

DESCRIPTION OF THE DRAWINGS

FIG. 1 is a diagram showing a main view of the structure of a particular embodiment of the present invention.

In FIG. 1: 1. rotating shaft, 2. rolling bearing, 3. driving connecting plate, 4. disc spring, 5. driving trolley, 6. driven connecting plate, 7. driven trolley, 8. cross beam.

DESCRIPTION OF A PREFERRED EMBODIMENT OF THE INVENTION

FIG. 1 shows an embodiment of the present invention, a transverse-longitudinal perpendicular automatic adjusting apparatus for use in a metal cutting machine installed on rails having a length of 12 meters and a distance of 4 meters there-between. The transverse-longitudinal perpendicular automatic adjusting apparatus comprises a cross beam, a driving trolley 5, and a driven trolley, wherein said cross beam 8 is a drawn cross beam, said driven trolley 7 is rigidly connected to one end of said cross beam 8, said driving trolley 5 and the other end of said cross beam 8 are equipped with a transverse-longitudinal perpendicular automatic adjusting assembly, wherein said transverse-longitudinal perpendicular automatic adjusting assembly comprises a rotating shaft 1, a rolling bearing 2, a driving connecting plate 3, and a disc spring 4, wherein a bottom surface of said cross beam 8 is connected to said driving connecting plate 3, a hole for housing said rolling bearing 2 is provided at a center of said driving connecting plate 3, and with said rolling bearing 2 placed in said hole, a bottom end of said rotating shaft 1 is fixed to said driving trolley 5 with said rotating shaft 1 passing through an upper surface of said driving trolley 5 and said disc spring 4; wherein said driven trolley 7 and said cross beam 8 are rigidly connected in such a way that said bottom surface of said cross beam 8 is connected to said driven connecting plate 6 and said driven connecting plate 6 is connected to said driven trolley 7; wherein said cross beam 8 is a one-time drawn beam drawn from aluminum alloy.

The embodiment described above is only a preferred embodiment of the present invention, but the scope of protection of the present invention is not limited to such embodiment. It will be apparent to those skilled in the art that various modifications and variations can be made without departing from the spirit or scope of the invention. Thus, it is intended that the present invention cover the modifications and variations of this invention provided they come within the scope of the appended claims and their equivalents.

The invention claimed is:

1. An automatic adjusting apparatus, comprising:
   a cross beam,
   a driving trolley, and
   a driven trolley,
   wherein
   said cross beam is a drawn cross beam,
   said driving trolley is laterally spaced apart from said driven trolley,
   said cross beam is disposed between said driving trolley and said driven trolley,
   said driven trolley is rigidly connected to one end of said cross beam,
   said driving trolley and the other end of said cross beam are equipped with an automatic adjusting assembly, wherein said adjusting assembly comprises:
   a vertical rotating shaft,
   a rolling bearing,
   a driving connecting plate, and
   a disc spring,
   wherein
   a bottom surface of said cross beam is connected to said driving connecting plate,
   a hole for housing said rolling bearing is provided at a center of said driving connecting plate, and with said rolling bearing placed in said hole,
   a bottom end of said rotating shaft is fixed to said driving trolley
   with said rotating shaft passing through an upper surface of said driving trolley and said disc spring;
   wherein
   said driven trolley and said cross beam are rigidly connected in such a way that said bottom surface of said cross beam is connected to a driven connecting plate and said driven connecting plate is connected to said driven trolley.

2. The automatic adjusting apparatus according to claim 1, wherein said drawn cross beam is a one-time drawn beam drawn from aluminum alloy.

3. The automatic adjusting apparatus according to claim 1, wherein said driving trolley is connected to the other end of said cross beam.

4. The automatic adjusting apparatus according to claim 1, wherein a top end of said rotating shaft is disposed within said hole of said driving connecting plate.

* * * * *